(12) United States Patent
Ding (10) Patent No.: US 10,501,011 B2
(45) Date of Patent: Dec. 10, 2019

(54) DYNAMIC BRAKE FORCE INDICATOR

(71) Applicant: THUNDER POWER NEW ENERGY VEHICLE DEVELOPMENT COMPANY LIMITED, Central (HK)

(72) Inventor: Jia-Wei Ding, Taipei (TW)

( * ) Notice: Subject to any disclaimer, the term of this patent is extended or adjusted under 35 U.S.C. 154(b) by 0 days.

(21) Appl. No.: 14/994,156

(22) Filed: Jan. 13, 2016

(65) Prior Publication Data

US 2017/0190283 A1    Jul. 6, 2017

Related U.S. Application Data

(60) Provisional application No. 62/272,716, filed on Dec. 30, 2015.

(51) Int. Cl.
| | | |
|---|---|---|
| *B60T 17/22* | (2006.01) | |
| *B60Q 1/44* | (2006.01) | |
| *B60T 7/04* | (2006.01) | |

(52) U.S. Cl.
CPC .............. *B60Q 1/444* (2013.01); *B60T 7/042* (2013.01); *B60T 17/22* (2013.01)

(58) Field of Classification Search
CPC ...................................................... B60Q 1/44
USPC ......................................................... 340/479
See application file for complete search history.

(56) References Cited

U.S. PATENT DOCUMENTS

| | | | | | |
|---|---|---|---|---|---|
| 3,787,808 | A | * | 1/1974 | Knopf .................... | B60Q 1/444 340/464 |
| 5,150,098 | A | * | 9/1992 | Rakow .................. | B60Q 1/444 340/464 |
| 9,132,839 | B1 | * | 9/2015 | Tan ........................ | B60W 50/00 |
| 2001/0054957 | A1 | * | 12/2001 | Cohen .................... | B60Q 1/444 340/479 |
| 2002/0161487 | A1 | * | 10/2002 | Kojima .................. | B60T 7/042 701/1 |

(Continued)

FOREIGN PATENT DOCUMENTS

| | | |
|---|---|---|
| CN | 101 547 538 A | 9/2009 |
| DE | 196 24 046 A1 | 12/1997 |

(Continued)

OTHER PUBLICATIONS

European Search Report for EP 16 20 7063 dated May 16, 2017, 9 pages.

*Primary Examiner* — John F Mortell
(74) *Attorney, Agent, or Firm* — Kilpatrick Townsend & Stockton, LLP (57) ABSTRACT

Dynamically displaying of a brake force is disclosed. A brake pedal force sensor can be used to generate signals indicating an amount or a level of brake force exerted on a brake pedal of a driving apparatus. Such signals can be processed to determine degrees of the brake force exerted. A set of display parameter values can be determined based on the determined degree of the brake force. The set of display parameters can include at least one value for illumination brightness, illumination area, illumination frequency, illumination color, and/or illumination style on a brake light of the driving apparatus. In certain embodiments, the display of the brake force is in a form of sliding bar and/or circular ring, and the brightness and/or the illumination area of the brake light is proportional to the determined degree of the brake force.

14 Claims, 6 Drawing Sheets

(56) References Cited

U.S. PATENT DOCUMENTS

2008/0309478 A1* 12/2008 Morales ................. B60Q 1/444
340/467
2013/0328675 A1* 12/2013 Roach ..................... B60Q 9/00
340/453
2014/0253315 A1*  9/2014 Bement ................. B60Q 1/447
340/479

FOREIGN PATENT DOCUMENTS

| DE | 196 38 135 A1 | 4/1998 |
| FR | 2 818 942 A1 | 7/2002 |
| KR | 2009 0121094 A | 11/2009 |

* cited by examiner

DYNAMIC BRAKE FORCE INDICATOR

CROSS-REFERENCE TO RELATED APPLICATIONS

The present application claims priority to U.S. Provisional Patent Application No. 62/272,716, filed on Dec. 30, 2015, the disclosure of which is hereby incorporated by reference in its entirety for all purposes.

FIELD

The present invention relates to vehicle brake light systems and, more particularly, to brake light systems in which brake lights at the rear of a vehicle are illuminated in response to depression of a brake pedal

BACKGROUND

Most vehicles are equipped with rearward facing visual signaling devices to indicate when the vehicles braking system is activated. Conventional brake systems in a vehicle typically operate when a brake pedal switch is closed and the vehicle is still in motion and a row of lamps at the rear of the vehicle are illuminated to simply indicate that the braking system is activated. This simple brake indication however may not be enough for the operator of a trailing vehicle to safely maneuver to avoid a rear end collision.

BRIEF SUMMARY

Embodiments can facilitate a dynamic display of brake force applied to a brake pedal in a driving apparatus. A high level of safety can be achieved if the operator of the trailing driving apparatus is alerted to a degree of brake force applied by the driving apparatus in front. In some embodiments, a pedal force sensor capable of determining an amount of brake force applied to a brake pedal can be employed. In those embodiments, the pedal force sensor can be attached to the top of the brake pedal in the driving apparatus. The pedal force sensor at the brake pedal can measure and record applied brake forces. A degree of the applied brake force relative to a maximum brake force that can be applied to the brake pedal can be determined. The degree of the applied brake force can be dynamically and visually displayed so that the operator of trailing driving apparatus can be aware of how strong the brake force applied by the driving apparatus in front. In those embodiments, the dynamic display of the applied brake force can include altering the illumination intensity, illumination area, frequency, and/or any other illumination parameters according to the brake force applied by the driving apparatus. In some embodiments, the dynamic display of the brake force is achieved through one or more rearward facing OLED lamps mounted at the back of the driving apparatus.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
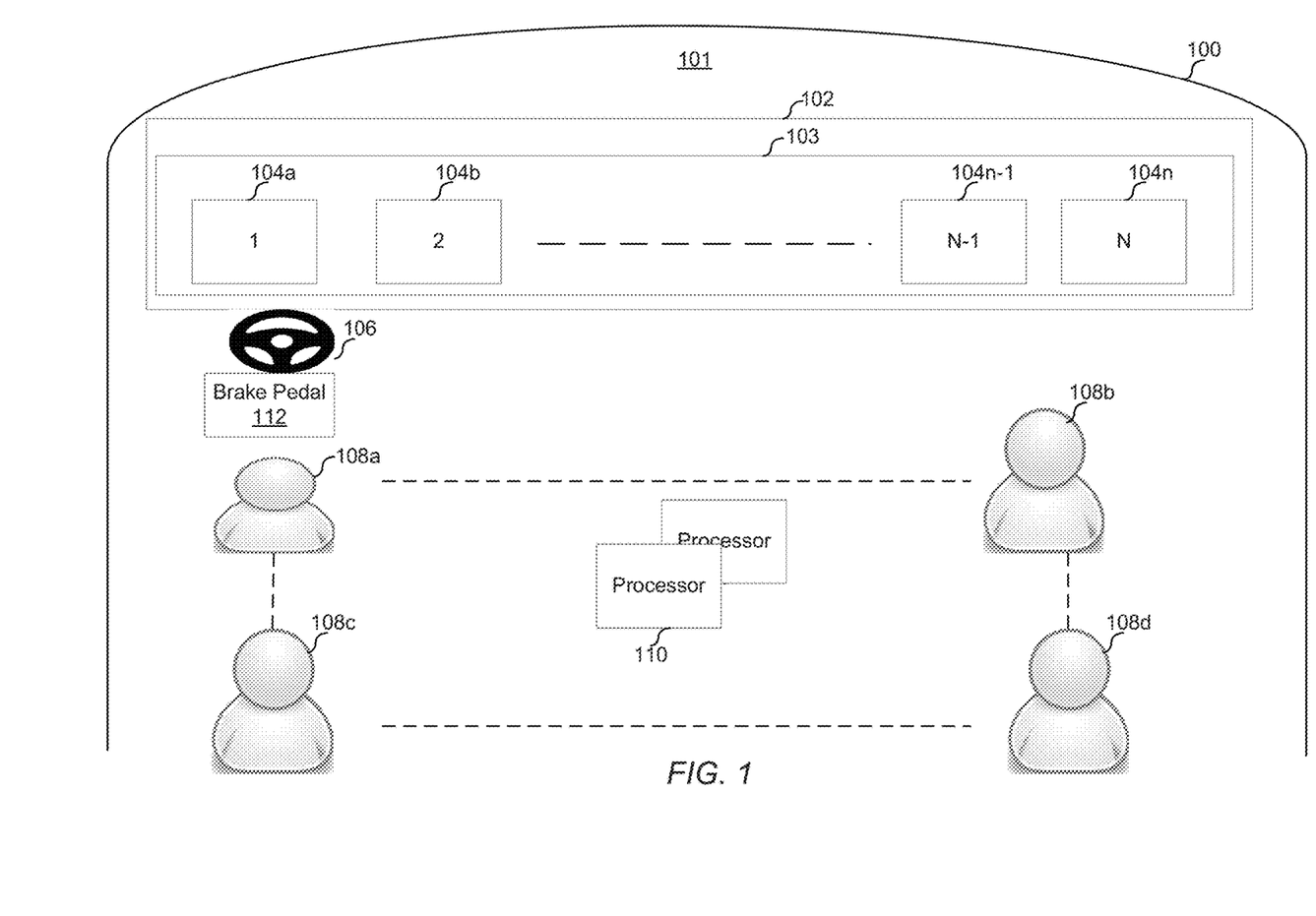
FIG. 1 generally illustrates an example of a driving apparatus in accordance with the disclosure.

FIG. 1 generally illustrates an example of a driving apparatus 100 in accordance with the disclosure. The driving apparatus 100 may include any apparatus that moves in distance. Examples of driving apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a spaceship, or any other type of aircraft; or may include any other transportation apparatus. In one example, the driving apparatus 100 is an electrical automobile. As shown, the driving apparatus 100 may include a cabin 101 with a volume.

As shown in FIG. 1, in the cabin 101, there may be a dashboard 102 that has a screen 103. Although in this example, a dashboard screen 103 occupies the entire surface of the dashboard 102, this is not intended to be limiting. It is contemplated that in some cases, the dashboard screen 103 may occupy a portion of the dashboard 102 instead of the entire dashboard 102. In any case, the dashboard screen 103 is suitable to display one or more information panels, such as the information panels 104 shown in FIG. 1. In implementations, the dashboard screen 103 may include any display technology, such as liquid-crystal display (LCD), crystal LCD, light-emitting diode (LED), organic light-emitting diode (OLED), active-matrix organic light-emitting diode (AMOLED), Plasma, projection panel, cathode ray tube (CRT), and/or any other display technology.

In some examples, information presented in the information panels 104 may include gauge information related to the transportation apparatus 100, such as current speed/altitude/direction/wind, current longitude/latitude, distance traveled, RPM, fuel level, battery level, and/or any other gauge information related to the transportation apparatus 100. In some examples, information presented in the information panels 104 may include indication information, such as seat belt, airbag, door, trunk, maintenance, safety, window lock, door lock indication information or any other indication information. In some examples, information presented in the information panels 104 may include navigational or GPS information related to navigation of the driving apparatus 100, such as current street traveled on, map of an area the transportation apparatus 100 is traveling in, the destination information, direction instructions, traffic condition, estimated arrival time, estimated delay due to traffic, and/or any other navigation information. In some examples, information presented in the information panels 104 may include cabin information, such as current temperature, humidity, wind speed, number of passengers in one or more zones in the cabin 101 and/or any other cabin information. In some examples, information presented in the information panels 104 may include configuration information regarding the transportation apparatus 100, such as seat configuration, mirror configuration, battery configuration, driving mode configuration, and/or any other configuration. In some examples, information presented in the information panels 104 may include entertainment information. For example, such an information panel may include a video screen capable of presenting a video or still images, a browser screen capable of presenting web information, a game screen capable of presenting one or more games for user interaction, a music information screen capable of enabling a user to consume music pieces, e-commerce information screen capable of enabling a user to engage remote transaction via the Internet, radio information screen capable of presenting a list of radio stations available for user consumption, and/or any other type of infotainment screen. In some examples, information presented in the information panels 104 may include notification information such as incoming call, incoming text message, incoming video chat request, and/or any other notification information. Other examples of information panels 104 are contemplated.

As still shown in FIG. 1, the driving apparatus 100 may comprise one or more steering wheels 106 in the cabin 101. Although only one steering wheel 106 is shown in FIG. 1, this is not intended to be limiting. In some examples, the driving apparatus 100 may include more than one steering wheel 106. For example, it is contemplated that the driving apparatus 100 may be an aircraft that comprises at least a main steering wheel 106 for the main pilot and at least a secondary steering wheel 106 for a co-pilot.

As also shown in FIG. 1, one or more users 108 may be arranged to occupy their corresponding positions in the cabin 101. The users 108 may include one or more drivers that control the movement or navigation of the driving apparatus 100, one or more passengers, and/or any other type of users 108. In this example, the user 108*a* is a driver that controls the driving of the driving apparatus 100, while other users 108, e.g., users 108*b-d*, are passengers. As still shown, there may be multiple rows of users 108 within the cabin 101 of the transportation apparatus 100.

As still shown in FIG. 1, driving apparatus 100 may include one or more processors 110 configured to control one or more electrical system or subsystems in driving apparatus 100. Types of processor 110 may include generic processor configured to execute machine-readable instructions, and/or specialized processors such as Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), speech recognition IC, and/or any other specialized processors.

Figure 2:
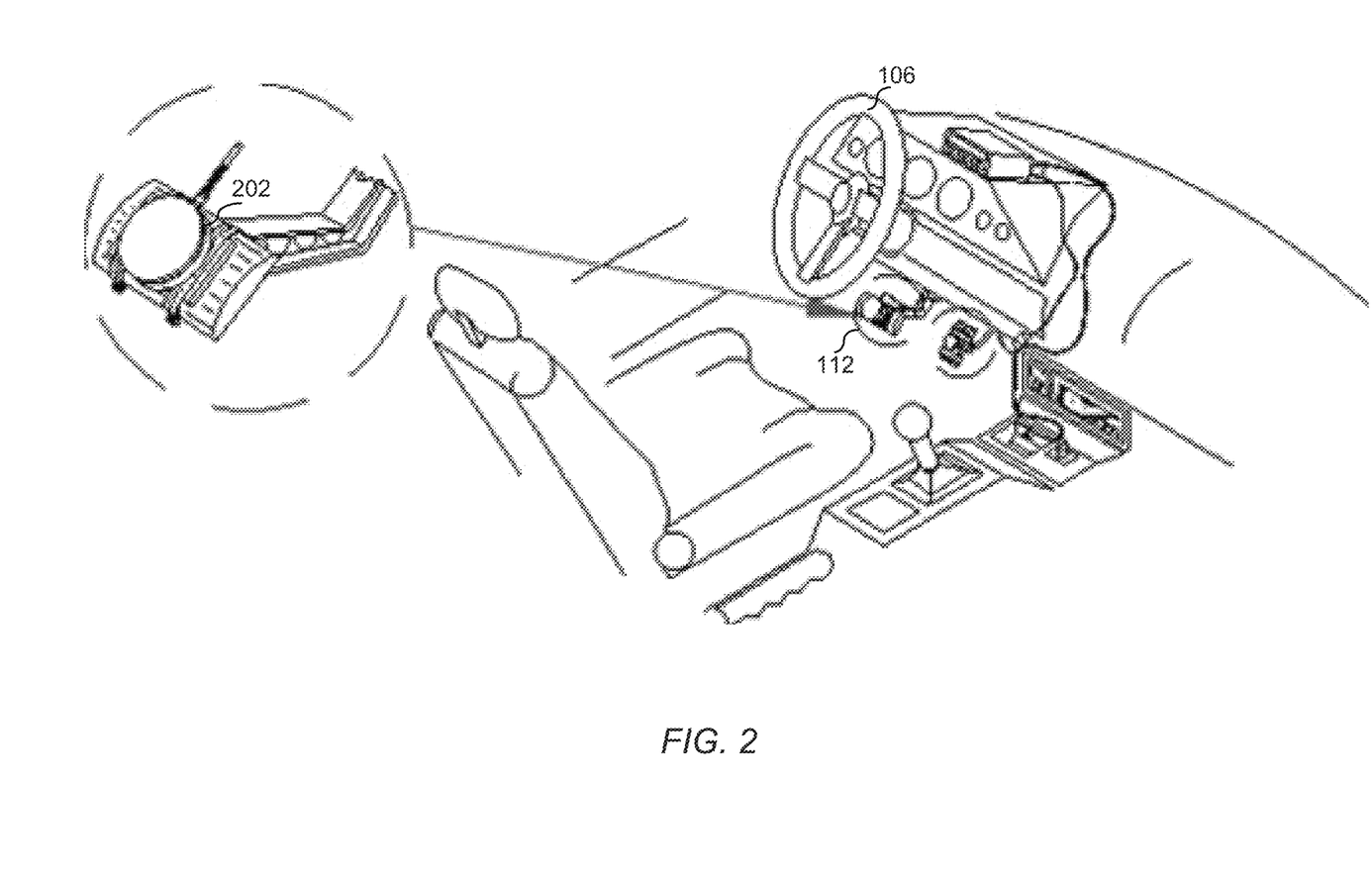
FIG. 2 illustrates an example of a pedal force sensor that can be installed on a brake pedal to measure a brake force applied to the brake pedal.

As also shown in FIG. 1, driving apparatus 100 may include a brake pedal 112. Brake pedal 112 may use friction, pumping, or electromagnetics to achieve braking. In general when the brake pedal 112 is pushed, a piston can push a brake pad against a brake disc which slows the driving apparatus 100 down. Frictional brakes can be divided into "shoe" or "pad" brakes, using an explicit wear surface; and hydrodynamic brakes, such as parachutes, which use friction in a working fluid and do not explicitly wear. Pumping brakes can be used where a pump is already part of the machinery. For example, an internal-combustion piston motor can have the fuel supply stopped, and then internal pumping losses of the engine create some braking. Electromagnetic brakes can be likewise used where an electric motor is already part of the machinery. For example, many hybrid gasoline/electric vehicles use the electric motor as a generator to charge electric batteries and also as a regenerative brake. A key to the present disclosure is a pedal force sensor can be installed on the brake pedal 112. FIG. 2 illustrates an example of a pedal force sensor that can be installed on brake pedal 112 to measure a brake force applied to the brake pedal 112.

As shown in FIG. 2, the brake pedal 112, placed beneath steering wheel 106, can have a pedal force sensor 202 attached to the top end of the brake pedal 112. The brake force exerted by an operator of driving apparatus 100 can be sensed by the pedal force sensor 202. In one embodiment, the pedal force sensor 202 is implemented using one or more of a pressure sensor. In that embodiment, the pressure sensor is capable of measuring the amount of brake force exerted on the brake pedal 112. Specifically, in that embodiment, the pressure sensor can act as a transducer and generate a signal as a function of the force applied to brake pedal 112. The generated signal can indicate an analog or electrical value indicating a force measurement of the brake force applied to brake pedal 112. As will be shown in FIG. 3, the generated signal can be transmitted to a processor 110 for processing and for determining a display of the brake force applied to the brake pedal 112 on one or more rearward facing brake lights installed on driving apparatus 100.

Figure 3:
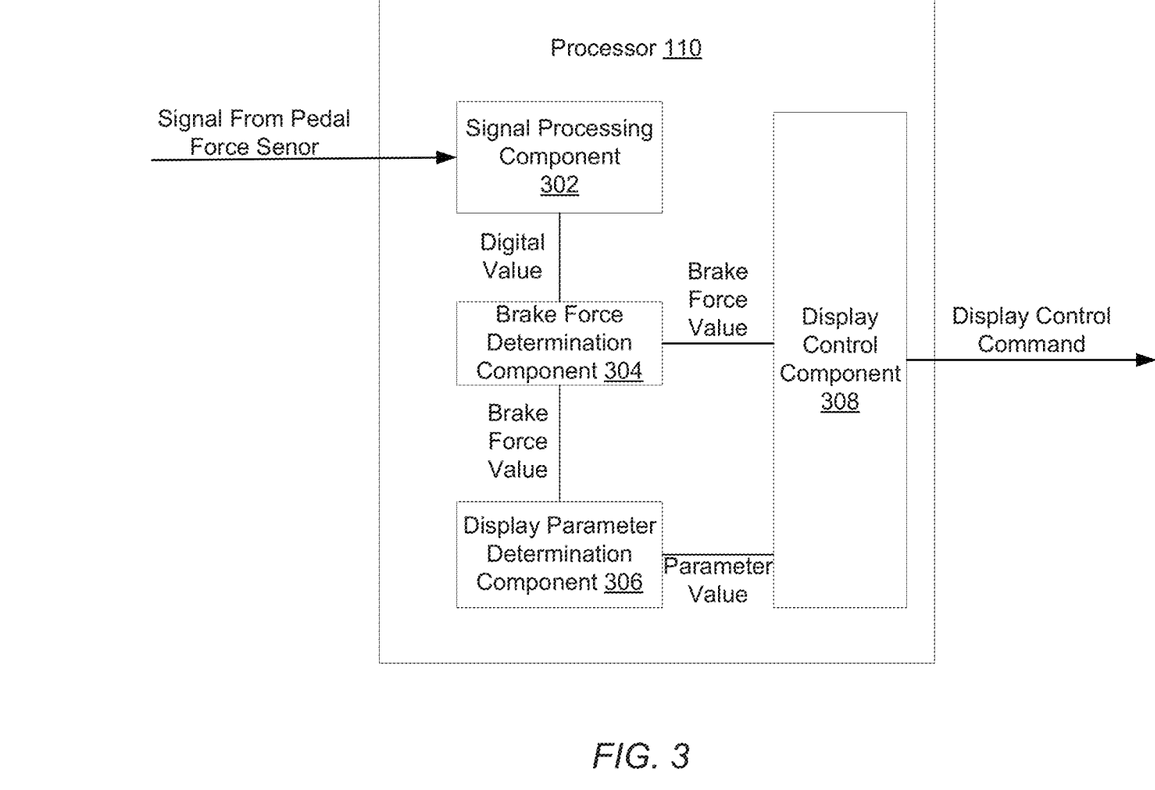
FIG. 3 illustrates a block diagram of a processor configured to facilitate dynamic display of brake force in accordance with one example of the disclosure.

FIG. 3 illustrates a block diagram of the processor 110 configured to facilitate dynamic display of brake force applied to brake force pedal 112 in accordance with one example of the disclosure. As shown in this example, the processor 110 may be configured to include a signal processing component 302, a brake force determination component 304, a display parameter determination component 306, a display control component 308, and/or any other components. The signal processing component 302 can be configured to process a signal received from the pedal force sensor 202. Processing the signal from the pedal force sensor 202 may involve analog signal processing if the signal provided by the pedal force sensor 202 is an analog signal. That is, in some examples, the signal received from the pedal force 202 can be an analog signal and signal processing component 302 can be configured to convert the analog signal from the pedal force 202 to a digital signal. In implementations, this may involve quantizing the analog signal and determining a discrete digital value based on the quantized analog signal. For example, the digital value produced by the signal processing component 302 can be in the form of a level—e.g., level 1, 2, 3, 4 . . . so on, with each level corresponding to a range in which the analog signal is found. The analog signal value range corresponding to each digital value can be predetermined by a provider of the driving apparatus 100. In this way, the brake force represented by the analog signal is mapped to a digital domain.

The resolution of the digital levels can be however desired. There could be a few as several digital levels corresponding to ranges of brake force applied to the brake pedal 112; or there could be as many as hundreds of digital levels.

It should be understood the aforementioned signal processing is just one implementation of the signal processing component 302 and thus not intended to be limiting. In some other embodiments, the signal from the pedal sensor 202 can be in the form of a digital value indicating a measurement of the brake force applied to the brake pedal 112. In those embodiments, the signal processing component 302 may be configured to simply decode the digital value indicated by the signal from the pedal force sensor 202 into a corresponding value. For example, the digital value may be an eight bit value such as "01100001" and the signal processing component 302 may be configured to decode the 8 bit value to an integer value.

The brake force determination component 304 can be configured to a measurement of the brake force based on the digital value provided by the signal processing component 302. In implementations, a function can be configured into the brake force determination component 304. The function may be used by brake force determination component 304 to determine a brake force value corresponding to the digital value provided by signal processing component 302. For example, without limitation, the digital value provided by the signal processing component 302 can be mapped to a particular force measurement, say, 500 Si. It should be understood that the measurement value determined by the brake force determination component 304 does not necessarily have to be an absolute value. In some embodiments, the brake force value determined by the brake force determination component 304 can be a percentage value indicating a degree of brake force applied to the brake pedal 112 relative in a pre-determined range. For example, the signal processing component 302 may provide a digital value indicating the applied brake force is at "level 2" and assume there are 20 levels predetermined by the provider of driving apparatus. In that example, the brake force determination component 304 may determine a percentage value indicating that the brake force applied to the brake pedal 112 is 20% of the maximum brake force that can be applied to the brake pedal 112.

The display parameter determination component 306 can be configured to determine values of one or more parameters for controlling a display of the brake force determined by the brake force determination component 304. The parameters determined by the display parameter determination component 306 may include illumination brightness, illumination area, illumination frequency, illumination color, illumination style and/or any other parameters for displaying the brake force. In implementations, the value of a particular parameter, for example, the brightness, may be determined based on a predetermined association between the value of the brake force determined by brake force determination component 304 and the value of a brightness parameter. For example, a table of such associations may be pre-configured in memory storage accessible to processor 110 and can be retrieved by display parameter determination component 306 for determining a value of the parameter. For example, associations between display brightness and corresponding brake force value(s) can be stored in the memory storage and upon receiving a particular brake force value from the brake force determination component 304. Likewise, other display parameter values like illumination area, illumination frequency, illumination color, illumination style, and/or any other parameter values can be determined in this way. Below is a table of exemplary associations between brake force values and various display parameters.

TABLE 1

| Brake Force | Brightness | Illumination Area (within the brake light) | Illumination Color | Illumination Style | Illumination ... Frequency |
|---|---|---|---|---|---|
| 1-100 Si | 10% | 10% | Light Blue | Flash | ... Every 0.5 seconds |
| 100-200 Si | 20% | 20% | Blue | Flash | ... Every 0.2 seconds |
| 200-300 Si | 30% | 30% | Light Green | Solid | ... Always |
| ... | | | | | ... |
| X-Z Si | 100% | 100% | Red | Solid With Warning | ... Always |

Figure 4:
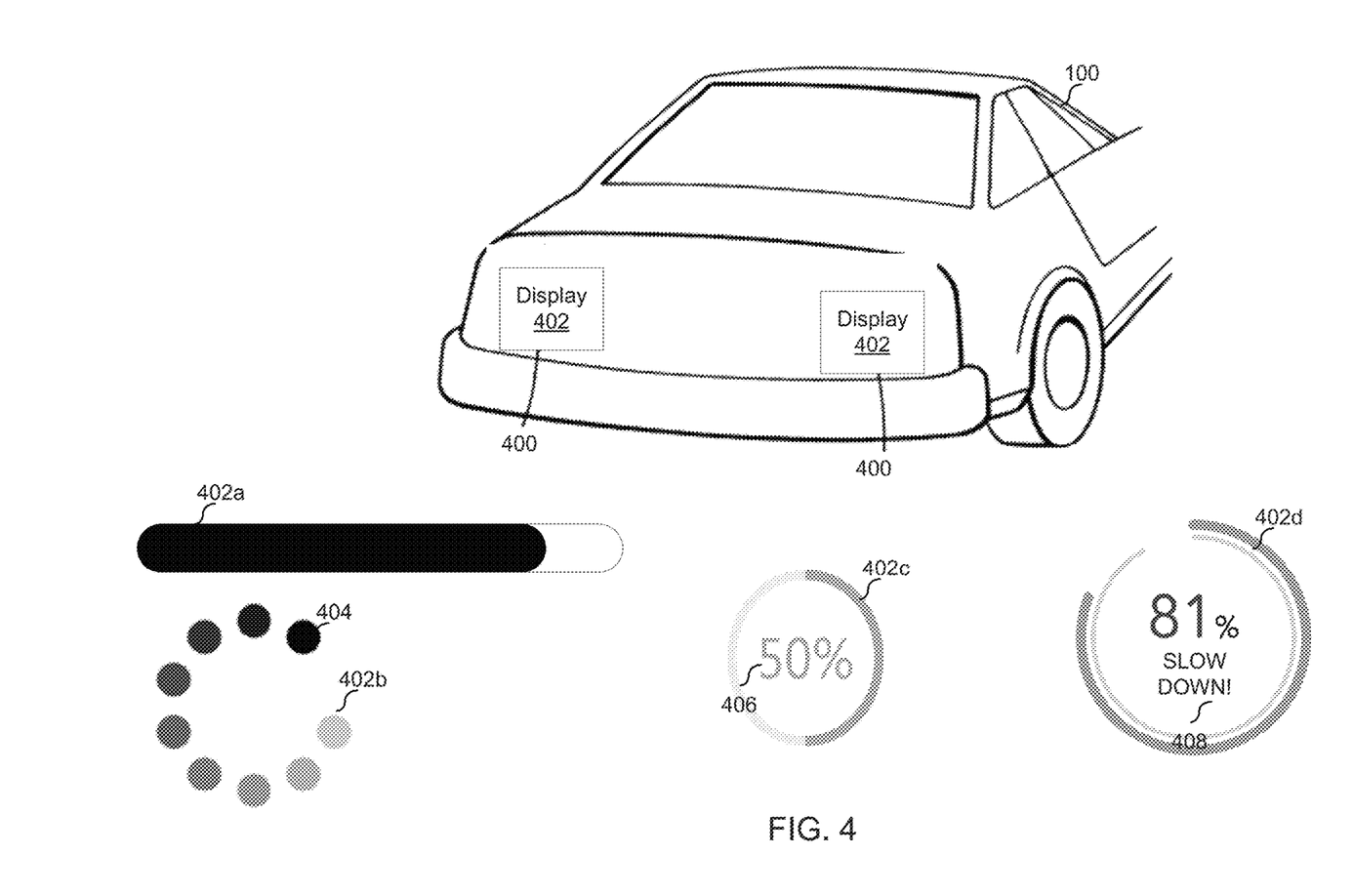
FIG. 4 illustrates some examples of dynamic display of a brake force applied to a brake pedal in accordance with the disclosure.

As shown above, the associations between brake force values and various parameter values for the display can be used to deterministically control a dynamic display of rearward facing brake lamp(s) installed on driving apparatus 100. FIG. 4 illustrates some examples of such dynamic display of the brake force. As shown, driving apparatus 100 may have one or more rearward display as brake light(s) or brake lamp(s) 400. In some embodiments, the brake light 400 is an OLED light such that various display aspects of the brake light 400 such as brightness, illumination area, text displayed, and so on can be controlled. As shown, in some embodiments, the display of brake force applied to brake pedal 112 on the brake light 400 can be display in various display forms 402 as shown. In some embodiments, the brake light 400 can display slide bar 402a such that the slider portion of the display 402a is proportional to the brake force applied to the brake pedal 112. As illustrated in this example, the slider portion of 402a can slide further to the right as the brake force applied to the brake pedal 112 increases. The degree of sliding can be, for example, based on the table 1 shown above. In some examples, the brightness of slider can also progressively darken as the slider moves further to the right.

As also shown, in some embodiments, the OLED display of brake force applied to brake pedal 112 can be displayed in a form of circular display 402b. As shown, each dot in the circular display 402b can have a different intensity, progressively from light grey to dark black. A particular brake force applied to the brake pedal 112 may correspond to a particular dot such that when that brake force is applied to brake pedal 112, all dots in the ring with lighter intensity up to that particular dot will illuminate to indicate a degree of the brake force. In this example, all dots up to dot 404 are illuminated to indicate the degree of the brake force applied to the brake pedal 112.

As still shown, in some embodiments, a percentage indication can be displayed to indicate a degree of brake force applied to the brake pedal 112. As shown in this example, the circular display 402c can have a ring like display similar to that of circular display 402b, but can also have a percentage display 406 to indicate to a percentage of the brake force applied relative to a predetermined maximum brake force. In this way, a clear indication can be presented to the operators of driving apparatus trailing the driving apparatus 100. In some embodiments, a text sign such as 408 can also be displayed within a display such as the circular display 402d as shown when the degree of brake force applied to the brake pedal 112 exceeds a threshold. The text sign 408 can give the operators of driving apparatus trailing the driving apparatus 100 a clear warning to perform the suggested action immediately (e.g., slow down) due to the degree of brake force applied by the operator of driving apparatus 100.

Returning to FIG. 3, the display control component 308 can be configured to generate control commands to control the display of one or more rearward facing brake lights based on the parameter values provided by the display parameter determination component 306. The control commands generated by the display control component 308 may be transmitted to a, for example, brake light display component to effectuate the display. In some embodiments, generating the control commands by the display control component 308 may involve verify one or more parameter values provided by the display parameter determination component 306. In those embodiments, the display control component 308 may be configured to periodically query the status and/or the capability of the brake light 400. Based on the queried status and capability of the brake light 400, the display control component 308 can determine whether the parameter values provided by the display parameter determination component 306 can be implemented by the brake light(s) 400.

Figure 5:
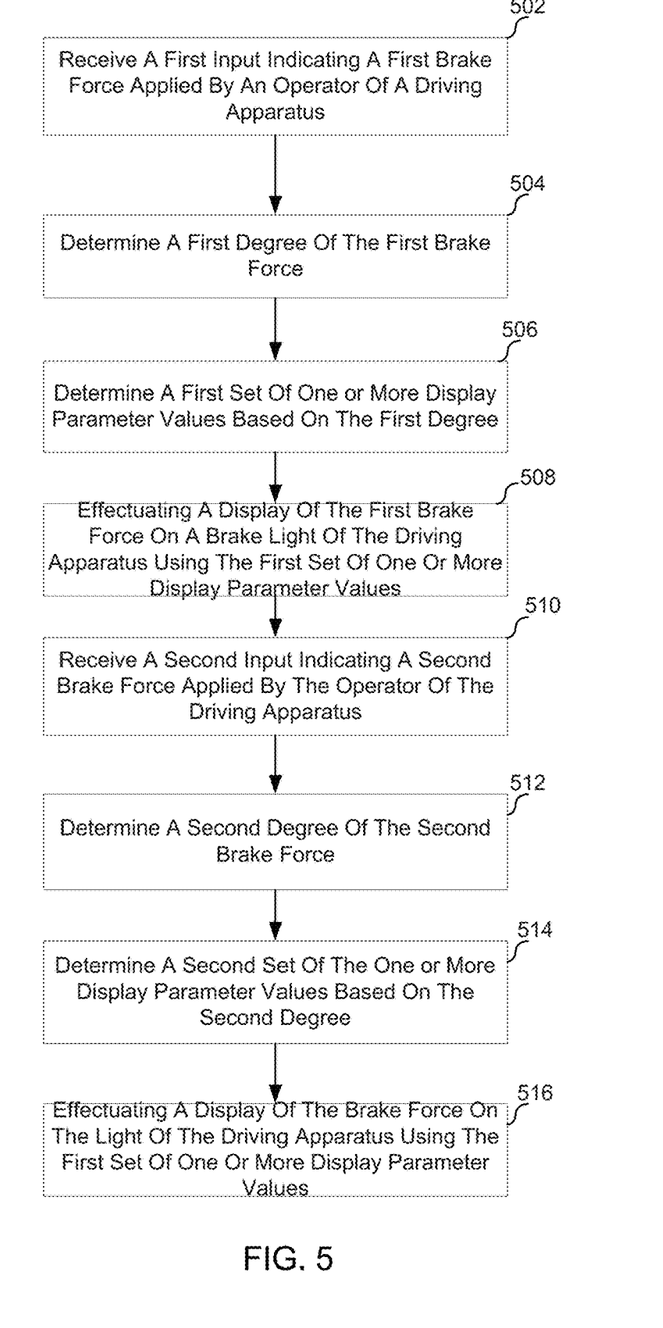
FIG. 5 illustrates an example of a process for facilitating a dynamic display of brake force applied to a brake pedal in a driving apparatus

FIG. 5 illustrates an example of a process 500 for facilitating a dynamic display of brake force applied to a brake pedal in a driving apparatus. Process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 can be performed under the control of one or more computer systems configured with executable instructions and can be implemented as code (e.g., executable instructions, one or more computer programs, or one or more applications) executing collectively on one or more processors, by hardware, or combinations thereof. The code can be stored on a computer-readable storage medium, for example, in the form of a computer program comprising a plurality of instructions executable by one or more processors. The computer-readable storage medium can be non-transitory.

At 502, a first input indicating a first brake force applied by an operator of a driving apparatus can be received from a pedal force sensor. An exemplary pedal force sensor is illustrated in FIG. 2 and described herein. In some embodiments, the first input can be an analog signal and in some other embodiments the first signal can be a digital signal. In some embodiments, the first signal can be an encoded value that requires decoding. In some examples, 502 can be performed by signal processing component the same as or substantially similar to the signal processing component 302 described and illustrated herein.

At 504, a first degree of the first brake force can be determined. The first degree of the first brake force can be calculated based on the first input received at 502. The first degree of the first brake force can be used to indicate a strength of the first brake force relative to a predetermined maximum brake force, for example, 20%, 30%, 40%, and so on. In some examples, 504 can be performed by brake force determination component the same as or substantially similar to brake force determination component 304 described and illustrated herein.

At 506, a first set of one or more parameter values can be determined based on the first degree of the first brake force determined at 504. The first set of parameter values determined at 506 may include illumination brightness, illumination area, illumination frequency, illumination color, illumination style and/or any other parameters for displaying the first brake force on one or more brake lights of the driving apparatus. In some examples, 506 can be performed by a display parameter determination component the same as or substantially similar to display parameter determination component 306 described and illustrated herein.

At 508, a display of the first brake force on the first brake light of the driving apparatus can be effectuated using the first set of one or more display parameter values. In some examples, 508 can be performed by display control component the same as or substantially similar to display control component 308 described and illustrated herein.

At 510, a second input indicating a second brake force applied by the operator of the driving apparatus can be received from the pedal force sensor. The second brake force can be greater than the first brake force. For example, the operator may encounter an emergency road block and slam on the brake pedal with the second brake force. As another example, the operator may progressively apply brake force to slow down driving apparatus, i.e., the first brake force at a first time instant and the second brake force at a second time instant, wherein the second time instant follows the first time instant immediately or substantially immediately. In some examples, 510 can be performed by signal processing component the same as or substantially similar to the signal processing component 302 described and illustrated herein.

At 512, a second degree of the second brake force can be determined. In some examples, 512 can be performed by brake force determination component the same as or substantially similar to brake force determination component 304 described and illustrated herein.

At 514, a second set of the one or more parameter values can be determined based on the second degree of the second brake force determined at 512. The second set of the one or more parameter values may differ from corresponding ones in the first set since the second brake force is greater than the first brake force. For example, both the first and second sets of the parameter values can include a brightness value. The brightness value in the second set can be higher than the brightness value in the first set to reflect that the second brake force is greater than the first brake force. Other parameter values like illumination area can be determined similarly for the second set. In some examples, 514 can be performed by a display parameter determination component the same as or substantially similar to display parameter determination component 306 described and illustrated herein.

At 516, a display of the second brake force on the brake light of the driving apparatus can be effectuated using the second set of the one or more display parameter values. In some examples, 508 can be performed by display control component the same as or substantially similar to display control component 308 described and illustrated herein.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
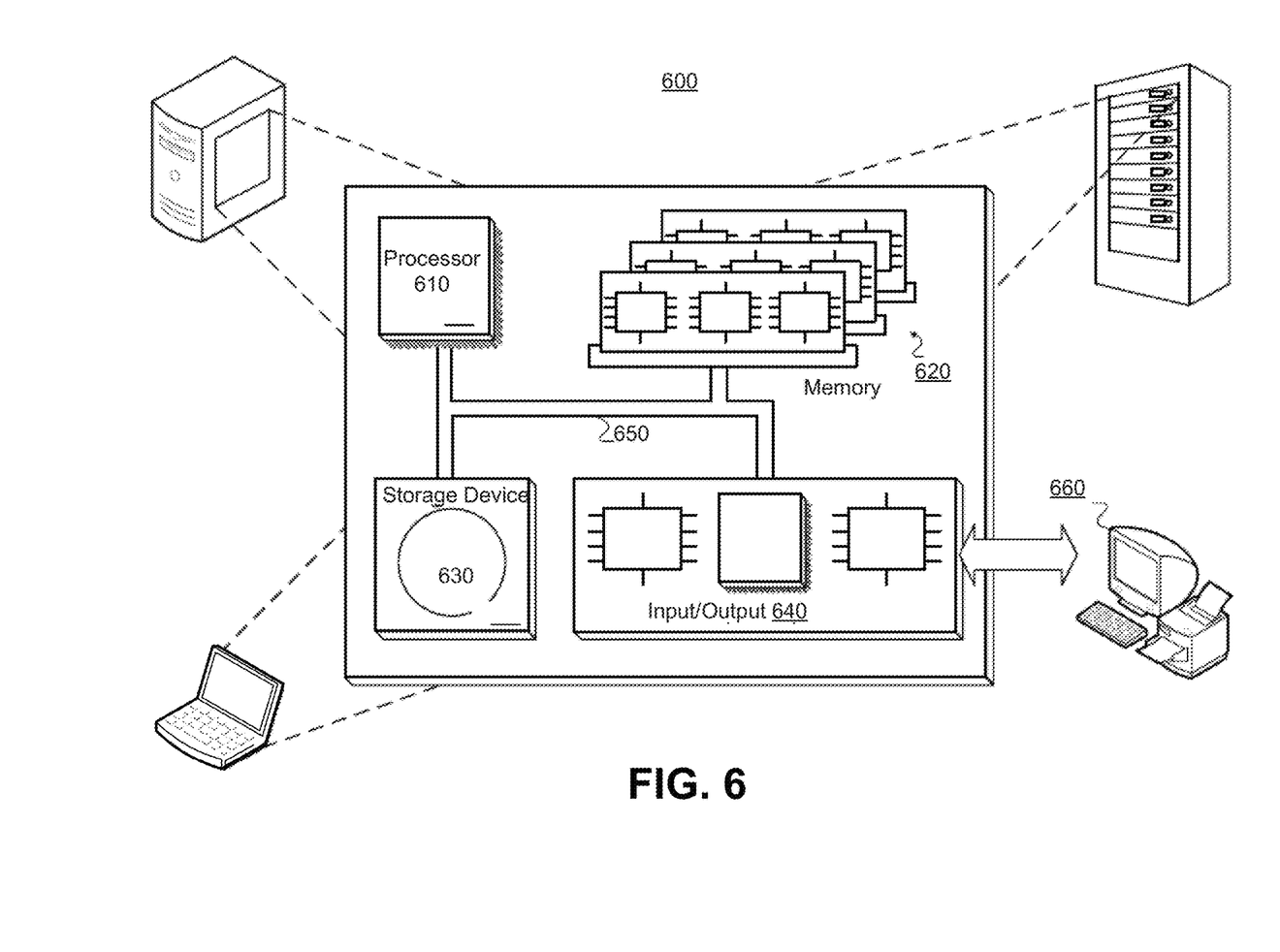
FIG. 6 is, a schematic diagram showing an example of a computer system for implementing a dynamic display of brake force applied to a brake pedal in accordance with some embodiments.

Referring to FIG. 6, a schematic diagram is shown of an example of a computer system 600. This system is exemplary only and one having skill in the art will recognize that variations and modifications are possible. The system 600 can be used for the operations described above. For example, the computer systems shown in FIG. 6 may be used to implement any or all of the techniques and routines described herein for facilitating a dynamic display of brake force.

The system 600 includes a processor 610, a memory 620, a storage device 630, and an input/output interface 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to provide graphical information via input/output interface 640 for display on a user interface of one or more input/output device 6100.

The memory 620 stores information within the system 600 and may be associated with various characteristics and implementations. For example, the memory 620 may include various types of computer-readable medium such as volatile memory, a non-volatile memory and other types of memory technology, individually or in combination.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 6100 provides input/output operations for the system 600. In one implementation, the input/output device 6100 includes a keyboard and/or pointing device. In another implementation, the input/output device 6100 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-7 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method for visually displaying brake force through a brake light installed on a driving apparatus, the method comprising:
    receiving, from a pedal force sensor, an input signal reflecting a brake force applied by an operator of the driving apparatus to a brake force pedal of the driving apparatus, wherein the input signal does not indicate an absolute value of the brake force;
    determining, based on the input signal, a predetermined brake force range the brake force applied by the operator belongs to, wherein the predetermined brake force range reflects a percentage value indicating a percentage relationship between the applied brake force and a maximum brake force applicable to the brake force pedal;
    determining a set of one or more display parameter values based on the predetermined brake force range;
    querying a status and/or a capability of the brake light;
    determining whether the parameter values are implementable by the brake light based on a result of the querying; and
    in response to a determination that the parameter values are implementable by the brake light, effectuating a display of the brake light using the set of one or more display parameter and a display of the percentage value in a numeric format.

2. The computer-implemented method of claim 1, wherein the set of the one or more parameter values include at least one value for illumination brightness, illumination area, illumination frequency, illumination color, and/or illumination style.

3. The computer-implemented method of claim 1, wherein the input is an analog signal.

4. The computer-implemented method of claim 1, wherein the input is a digital signal.

5. The computer-implemented method of claim 1, wherein the determined value of the brake force is a value indicating an amount of force exerted by the operator on the brake pedal.

6. The computer-implemented method of claim 1, further comprising determining a text warning for display on the brake light when the predetermined brake force range exceeds a predetermined threshold.

7. The computer-implemented method of claim 1, wherein the display of the brake force is in a form of sliding bar and/or circular ring, wherein the brightness and/or the illumination area of the brake light is proportional to the brake force.

8. A system for visually displaying brake force through a brake light installed on a driving apparatus, the system comprising one or more processors configured by machine-readable instructions to perform:
    receiving, from a pedal force sensor, an input signal reflecting a brake force applied by an operator of the driving apparatus to a brake force pedal of the driving apparatus, wherein the input signal does not indicate an absolute value of the brake force;
    determining, based on the input signal, a predetermined brake force range the brake force applied by the operator belongs to, wherein the predetermined brake force range reflects a percentage value indicating a percentage relationship between the applied brake force and a maximum brake force applicable to the brake force pedal;
    determining a set of one or more display parameter values based on the predetermined brake force range;
    querying a status and/or a capability of the brake light; and
    determining whether the parameter values are implementable by the brake light based on a result of the querying; and
    in response to a determination that the parameter values are implementable by the brake light, effectuating a display of the brake light using the set of one or more display parameter and a display of the percentage value in a numeric format.

9. The system of claim 8, wherein the set of the one or more parameter values include at least one value for illumination brightness, illumination area, illumination frequency, illumination color, and/or illumination style.

10. The system of claim 8, wherein the input is an analog signal.

11. The system of claim 8, wherein the input includes digital signals.

12. The system of claim 8, wherein the determined value of the brake force is a value indicating an amount of force exerted by the operator on the brake pedal.

13. The system of claim 8, the processors are further configured to perform determining a text warning for display on the brake light when the brake force exceeds a predetermined threshold.

14. The system of claim 8, wherein the display of the brake force is in a form of sliding bar and/or circular ring, wherein the brightness and/or the illumination area of the brake light is proportional to the brake force.

* * * * *